(12) United States Patent
Yabe et al.

(10) Patent No.: US 6,228,813 B1
(45) Date of Patent: May 8, 2001

(54) ROLLING BEARING FILLED WITH A LUBRICANT-CONTAINING POLYMER AND PROCESS OF THE SAME

(75) Inventors: Toshikazu Yabe, Saitama; Takahiko Uchiyama, Kanagawa; Atsuhiro Yamamoto, Saitama, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 08/936,833

(22) Filed: Sep. 25, 1997

Related U.S. Application Data

(62) Division of application No. 08/674,854, filed on Jul. 3, 1996, which is a continuation of application No. 08/235,920, filed on May 2, 1994, now abandoned.

(30) Foreign Application Priority Data

| Apr. 30, 1993 | (JP) | 5-124618 |
|---|---|---|
| May 24, 1993 | (JP) | 5-142493 |
| Oct. 20, 1993 | (JP) | 5-284126 |
| Oct. 20, 1993 | (JP) | 5-284127 |
| Nov. 15, 1993 | (JP) | 5-307107 |
| Dec. 1, 1993 | (JP) | 5-329561 |

(51) Int. Cl.$^7$ ............................................. C10M 111/00
(52) U.S. Cl. .......................... 508/106; 508/107; 508/207; 508/419; 508/502; 508/588; 508/591; 384/463; 384/523
(58) Field of Search .................................... 384/463, 523; 508/106, 107, 207, 419, 502, 588, 591

(56) References Cited

U.S. PATENT DOCUMENTS

| 3,194,759 | 7/1965 | Devine et al. ................. 508/167 |
|---|---|---|
| 3,541,011 | 11/1970 | Davis et al. . |
| 3,547,819 | 12/1970 | Davis et al. . |
| 3,729,415 | 4/1973 | Davis et al. . |
| 3,790,239 | * 2/1974 | Laux et al. .................... 308/206 |
| 3,933,657 | 1/1976 | Seni et al. ...................... 252/29 |
| 3,994,814 | * 11/1976 | Cairns ............................. 508/104 |
| 4,011,189 | 3/1977 | Keil ................................ 252/12 |
| 4,048,370 | 9/1977 | Orkin et al. ................... 252/12 |
| 4,073,552 | * 2/1978 | Christy ........................... 308/201 |
| 4,080,233 | * 3/1978 | McCloskey et al. .......... 508/106 |
| 4,100,245 | 7/1978 | Horikawa et al. ............ 252/12.4 |
| 4,118,235 | 10/1978 | Horiuchi et al. . |
| 4,146,487 | 3/1979 | Rumirez . |
| 4,239,632 | 12/1980 | Baile . |
| 4,308,063 | 12/1981 | Horiuchi et al. . |
| 4,401,781 | 8/1983 | Yoshifuji . |
| 4,427,803 | 1/1984 | Fukui et al. . |
| 4,492,415 | * 1/1985 | Baile et al. .................... 384/463 |
| 4,534,871 | * 8/1985 | Johnson ......................... 508/100 |
| 4,719,022 | 1/1988 | Hyde ............................. 508/449 |
| 4,787,991 | 11/1988 | Morozumi et al. . |
| 5,079,299 | 1/1992 | Hisamoto et al. . |
| 5,354,487 | 10/1994 | Aoki et al. ..................... 252/12 |
| 5,588,751 | 12/1996 | Nakata et al. . |

FOREIGN PATENT DOCUMENTS

| 1163123 | 9/1969 | (GB) . |
|---|---|---|
| 55137198 | 4/1979 | (JP) . |
| 5748035 | 4/1979 | (JP) . |
| 63-57615 | 12/1988 | (JP) . |

\* cited by examiner

*Primary Examiner*—Margaret Medley
(74) *Attorney, Agent, or Firm*—Sughrue, Mion, Zinn, Macpeak & Seas, PLLC

(57) ABSTRACT

Disclosed is a lubricative composition obtained by polymerizing a monomer or prepolymer for a thermosetting resin or by crosslinking a crosslinking resin, the polymerization and crosslinking being conducted in either a lubricating oil or a grease containing the lubricating oil as a base oil. The lubricative composition is usable at high temperatures, free from lubricating-oil or grease deterioration, and excellent in mechanical strength and moldability and in the amount of the lubricating oil held therein.

8 Claims, 1 Drawing Sheet

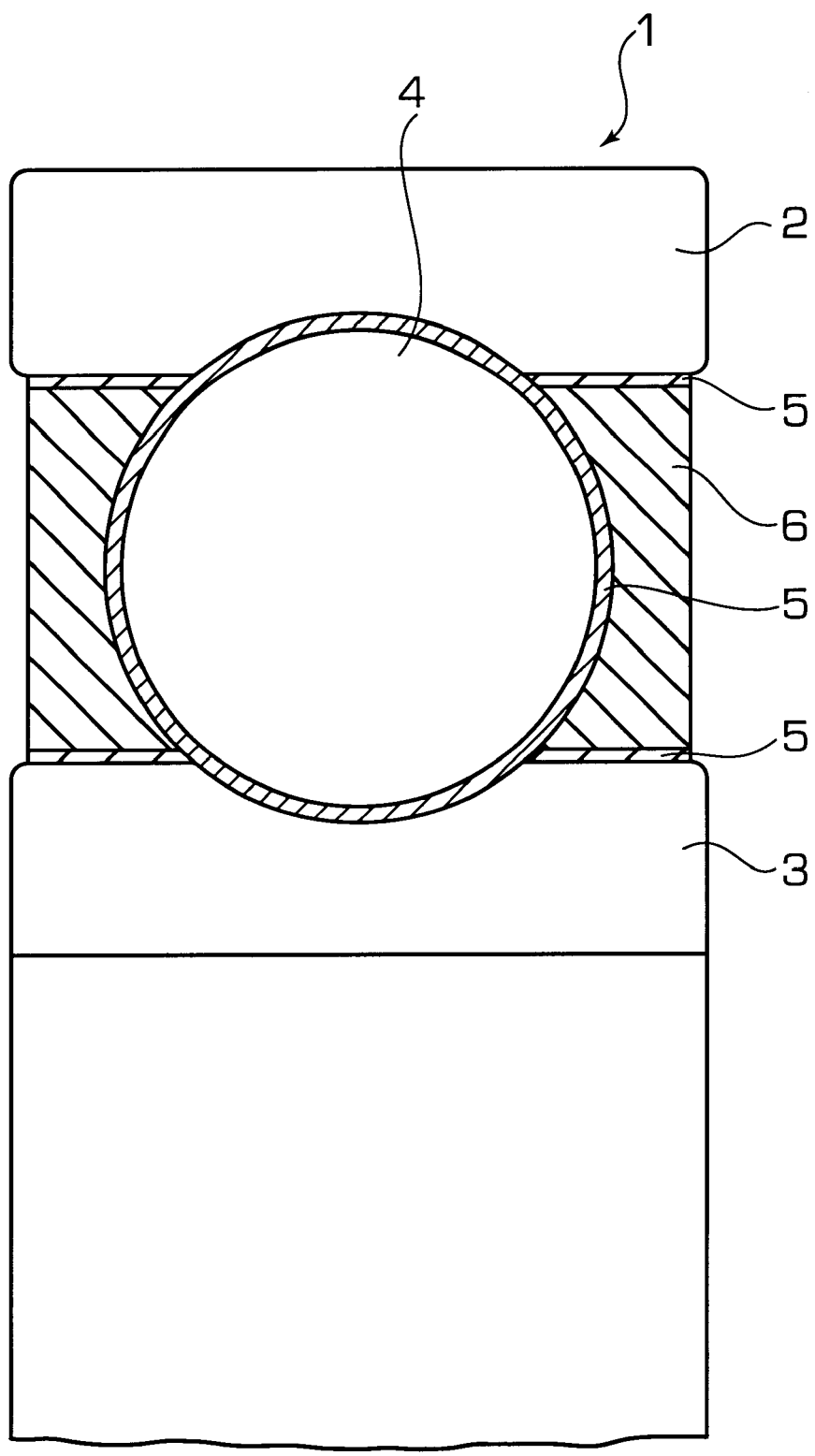

ROLLING BEARING FILLED WITH A LUBRICANT-CONTAINING POLYMER AND PROCESS OF THE SAME

This is a divisional of application Ser. No. 08/674,854 filed Jul. 3, 1996, in turn File Wrapper Continuation of 08/235,920 filed May 2, 1994, abandoned.

FIELD OF THE INVENTION

The present invention relates to a lubricative composition, more particularly, a lubricative composition applicable especially to parts to be exposed to high temperatures, e.g., bearings. The present invention further relates to a rolling bearing packed with a lubricant-containing polymer member and to a process for producing the bearing.

BACKGROUND OF THE INVENTION

Parts which need lubrication, e.g., bearings, are generally packed with lubricative compositions such as lubricating oils and semisolid greases. However, since these lubricative compositions including semisolid greases, not to mention lubricating oils, become more flowable with increasing temperature during operation of the bearings, the lubricant-filled spaces should be sealed with a sealing member, e.g., a sealing plate, in order to prevent the lubricative compositions from flying out. However, sealing makes the bearings have a complicated structure. In some cases, it is impossible to dispose a sealing member, as in small-sized bearings.

As a lubricative composition eliminating the necessity of a sealing member, a solid lubricative composition obtained by mixing a lubricating oil and a resin has been developed and put to practical use. In this resin-based lubricative composition, the lubricating oil held in the resin oozes out to the resin surface to exert lubricity. For example, polyethylene containing a lubricating oil is described in U.S. Pat. Nos. 3,729,415, 3,547,819, and 3,541,011. In British Patent 1,163,123 is described a similar lubricative composition which employs polypropylene besides polyethylene. Further, another similar lubricative composition employing polymethylpentene is described in U.S. Pat. Nos. 4,239,632 and 4,146,487.

Further, a polyethylene-based lubricative composition employing a grease in place of a lubricating oil is described in JP-A-55-137198. (The term "JP-A" as used herein means an "unexamined published Japanese patent application".)

In JP-A-55-137198 is described a lubricative composition comprising ultrahigh-molecular polyethylene having a molecular weight of about from $1 \times 10^6$ to $5 \times 10^6$ and a lubricating grease held in the polyethylene.

Furthermore, a lubricative composition based on an oil-containing crosslinked resin is described in JP-B-63-21698 which comprises crosslinked polyethylene obtained by heat-treating high-density polyethylene in the presence of a crosslinking agent and, contained in the crosslinked polyethylene, 15 to 45 wt % polyoxyalkylene glycol monoether based on the amount of the whole crosslinked polyethylene. (The term "JP-B" as used herein means an "examined Japanese patent publication".)

However, of the resin-based lubricative compositions described above, the lubricative composition comprising polyethylene and either a lubricating oil or a grease has the following problems. That is, it is unusable at temperatures not lower than 80° C. because the polyethylene, having a low melting point, begins to soften at about 80° C. and completely melts at 130 to 140° C. In addition, there is another drawback that a mixture of polyethylene and either a lubricating oil or a grease should be maintained at a temperature (130–140° C.) not lower than the melting point of the polyethylene for a long time in order to melt the polyethylene to homogeneously incorporate the lubricating oil or grease into the polyethylene and this treatment may deteriorate the lubricating oil and grease.

The lubricative composition based on ultrahigh-molecular polyethylene is unsatisfactory in mechanical strength and moldability although it has improved heat resistance. Hence, when packed into a bearing or the like, the composition suffers a deformation or breakage with the revolution of the rolling elements and comes out from the filled space.

The lubricative composition based on crosslinked polyethylene is free from the problems concerning mechanical strength and moldability which problems are encountered in the above-described composition based on ultrahigh-molecular polyethylene. However, because of the low polarity of polyethylene itself, the polymer shows poor retention of a highly polar lubricating oil. For example, in the case of the polyoxyalkylene glycol monoether mentioned above, the amount thereof which can be retained by the polyethylene is as small as 15 to 45 wt % based on the amount of the whole polyethylene. Hence, when the lubricative composition is applied to a bearing or the like, the oozing of the lubricating oil ends within a short time, posing a problem concerning lubricity life.

Further, the lubricative composition comprising polypropylene and a lubricating oil and that comprising polymethylpentene and a lubricating oil have similar problems. That is, the composition comprising polypropylene and a lubricating oil is unusable at temperatures not lower than 120° C. because the polypropylene, although having a slightly higher melting point than the polyethylene mentioned above, begins to soften at about 120° C. and completely melts at 160 to 170° C. In addition, it is necessary that for homogeneously incorporating a lubricating oil or grease, the polypropylene/lubricant mixture be maintained at a higher temperature (160–170° C.) than the polyethylene composition for a long time and this treatment deteriorates the lubricating oil and grease more severely than that heated with polyethylene.

On the other hand, the lubricative composition comprising polymethylpentene and either a lubricating oil or a grease is usable at high temperatures since the polymethylpentene has a higher melting point than polyethylene, polypropylene, etc. However, it is necessary that for homogeneously incorporating the lubricating oil, the polymethylpentene/lubricant mixture be maintained at an exceedingly high temperature of 230 to 260° C., upon which treatment the lubricating oil or grease deteriorates considerably.

The conventional rolling bearings packed with a lubricant-containing polymer member have had the following problems. In particular, in the case of a bearing in which the whole space between the outer and inner races except the space occupied by the rolling elements is completely filled with a lubricant-containing polymer member, the friction between the lubricant-containing polymer member and the inner wall of the outer race and between the polymer member and the outer wall of the inner race may cause a torque increase and a bearing temperature increase. Further, a-friction-generated powder of the lubricant-containing polymer member inhibits the smooth revolution of each revolving member to cause the so-called gripping phenomenon, vibration of the whole bearing, etc., and as a result, the bearing comes to no longer perform its function.

It should be further noted that the disposition of a lubricant-containing polymer member in a rolling bearing is accomplished by packing the lubricant-containing polymer in a gel or paste state into the bearing at the space formed by the outer and inner races and the rolling elements, heating the packed polymer, and then cooling the polymer to solidify it to thereby hold the polymer member in the space. Therefore, when some kinds of polymers, in particular ones which contract little according to the solidification or ones which are too elastic, are used, there are cases where the outer and inner races and the rolling elements are pressed by the lubricant-containing polymer member and the bearing comes not to work at all.

SUMMARY OF THE INVENTION

An object of the present invention is to provide a lubricative composition usable at high temperatures and free from lubricating-oil or grease deterioration to thereby overcome the problems described above. Another object of the present invention is to provide a lubricative composition usable at high temperatures and excellent in mechanical strength and moldability and in the-amount of the lubricating oil held therein.

Further objects of the present invention are to provide a rolling bearing packed with a lubricant-containing polymer member in which the frictional resistance between members of the bearing is diminished and smooth revolution can be maintained independently of the kind of the polymer, and to provide a process for producing the bearing.

The above objects are accomplished with a lubricative composition obtained by polymerizing a monomer or prepolymer for a thermosetting resin or by crosslinking a crosslinking resin (e.g., polynorbornene and ultrahigh-molecular polyethylene) and, said polymerization and crosslinking being conducted in either a lubricating oil or a grease containing the lubricating oil as a base oil.

Specifically, the first embodiment of the above-described composition is a lubricative composition which is excellent in heat resistance and free from lubricating-oil or grease deterioration, and is obtained by polymerizing a monomer or prepolymer for a thermosetting resin in either a lubricating oil miscible with the thermosetting resin or a grease containing the lubricating oil as a base.

The second embodiment is a lubricative composition which is excellent in heat resistance and free from silicone-oil or silicone-grease deterioration, and is obtained by polymerizing an uncured precursor for a cured silicone rubber (the precursor being hereinafter referred to as "base silicone") in either a silicone oil or a grease containing the silicone oil as a base oil.

The third embodiment is a lubricative composition which is excellent in heat resistance and free from lubricating-oil or grease deterioration, and is obtained by crosslinking polynorbornene in the presence of, absorbed therein, either a lubricating oil or a grease containing the lubricating oil as a base oil to thereby unite the crosslinked polymer with the lubricant.

The fourth embodiment is a lubricative composition which is excellent in heat resistance, mechanical strength, moldability, and the amount of the lubricant held therein and capable of retaining its stable lubricity performance over long, and is obtained by crosslinking ultrahigh-molecular polyethylene along with either a lubricating oil or a grease containing the lubricating oil as a base oil in the presence of a crosslinking agent, and by crosslinking ultrahigh-molecular polyethylene and a diallyl phthalate type monomer along with either a lubricating oil or a grease containing the lubricating oil as a base oil in the presence of a crosslinking agent.

The fifth embodiment is a lubricative composition which is excellent in heat resistance, free from lubricating-oil or grease deterioration, and also excellent in the ability to hold a lubricating oil or grease, and is obtained by homogeneously incorporating a highly oil-absorbing polymer into the above-described lubricative compositions, particularly those of the first and fourth embodiments.

The lubricative composition of the present invention is advantageously applied to:

A rolling bearing packed with a lubricant-containing polymer member at a space formed by the outer and inner races and the rolling elements, the bearing having a structure in which the inner circumferential surface of the outer race, the outer circumferential surface of the inner race, and the surfaces of the rolling elements have a coating layer of a release agent, in particular a fluorine-compound release agent; and A process for producing a rolling bearing packed with a lubricant-containing polymer member at a space formed by the outer and inner races and the rolling elements which comprises assembling a bearing, subsequently forming a coating layer of a release agent, in particular a fluorine-compound release agent, on the inner circumferential surface of the outer race, the outer circumferential surface of the inner race, and the surfaces of the rolling elements, and then packing and solidifying a lubricant-containing polymer member in the bearing.

BRIEF DESCRIPTION OF THE DRAWING

FIG. 1 is a sectional view illustrating part of a rolling bearing according to the present invention which is packed with a lubricant-containing polymer member.

DETAILED DESCRIPTION OF THE INVENTION

In the lubricative composition as the first embodiment of the invention, the lubricating oil or grease is homogeneously contained and held in the whole resin because the three-dimensional crosslinking of the monomer or prepolymer for forming a network structure proceeds in such a manner that the lubricating oil or grease is included in minute spacings of the network. As a result, the lubricative composition yielded contains the lubricating oil or grease in a large amount and is excellent in lubricant-holding ability, so that the lubricating oil or grease continues to gradually ooze out over a long time and stable lubricity can be maintained over long.

This composition also has excellent thermal stability because of the thermosetting resin employed therein and, hence, at high temperatures it never becomes flowable and unable to retain its shape. Moreover, since the polymerization reaction is completed in a short time, the problem of lubricating-oil or grease deterioration during production can be avoided.

Examples of the thermosetting resin that can be employed in this invention include a diallyl phthalate type resin, a phenolic type resin, and a polycarbodiimide type resin.

More specifically, examples of the diallyl phthalate type resin include homopolymers of diallyl phthalate, diallyl isophthalate, and diallyl terephthalate monomers, homopolymers of prepolymers of these diallyl esters, copolymers of two or more of these monomers or prepolymers, and mixtures of these homopolymers with these copolymers.

Since this diallyl phthalate type resin cannot be heat-cured when heated alone, it is usually necessary to use a peroxide as a hardener (polymerization initiator). Usable peroxides include benzoyl peroxide, m-toluoyl peroxide, t-butyl peroxide, t-butyl peroxybenzoate, di-t-butyl peroxyisophthalate, 2,5-dimethyl-2,5-di(benzoylperoxy)hexane, dicumyl peroxide, and the like. These hardeners are added in polymerization in an amount of about several percents by weight, usually about 1 wt %, based on the amount of the resin.

Examples of the phenolic type resin include a resol-type purely phenolic resin, a novolak-type purely phenolic resin, and various kinds of modified phenolic resins. Example of the modified phenolic resins include cashew-modified phenolic resins (novolak type and resol type) and oil-modified phenolic resins (novolak type).

The novolak-type phenolic resins do not cure by themselves and, hence, it is necessary to add hexamine or a resol-type phenolic resin as a hardener. In contrast, the resol-type phenolic resins cure with heating even in the absence of a hardener.

The oil-modified phenolic resins cannot be used alone because they are low in the ability to hold a lubricating oil after cure. It is therefore necessary to use the resins as a mixture with other phenolic resin.

Further, the polycarbodiimide type resin cures with heating even in the absence of any additive ingredient.

On the other hand, the lubricating oil that can be used in this invention should be miscible with the thermosetting resin described above. The lubricating oil miscible with the thermosetting resin is one capable of forming a homogeneous mixture which neither separates into two phases nor yields settlings after being allowed to stand for 24 hours at a temperature of 25° C., by being mixed with the thermosetting resin. Examples thereof include ester oils such as diisodecyl phthalate, di-2-ethylhexyl phthalate, diisodecyl adipate, di-2-ethylhexyl sebacate, and tri-2-ethylhexyl trimellitate, polyol ester oils, and phenyl ether oils such as octadecyldiphenyl ether, tetraphenyl ether, and pentaphenyl ether.

In the present invention, a grease containing the above-described lubricating oil as a base oil can be used in place of the lubricating oil. In this case, a known metal soap, e.g., a lithium soap, is added in an appropriate amount to the lubricating oil to prepare the grease.

Care should be taken in selecting a resin/lubricating oil combination because the miscibility of lubricating oils with thermosetting resins varies depending on the kind of the thermosetting resins, and because there are cases where even when a resin and either a lubricating oil or a grease are in a homogeneously dissolved state before cure, the resin separates from the lubricating oil or grease after cure.

The diallyl phthalate type resins are miscible with all the lubricating oils or greases mentioned above and, hence, any combination gives a satisfactory lubricative composition. However, the phenolic type resins and the carbodiimide type resin are limited in combination. For example, it is preferred to use the purely phenolic resins in combination with polyphenyl ether oils, the cashew-modified phenolic resins with diester oils and polyol ester oils, and the oil-modified phenolic resins with polyphenyl ether oils and alkylpolyphenyl ether oils. In the case of the polycarbodiimide type resin, use of polyphenyl ether oils is preferred.

For the purpose of enhancing the mechanical strength of the lubricative composition or improving the moldability thereof, fillers such as the following may be added.

Exemplary fillers that can be added include mineral fillers, e.g., calcium carbonate, talc, silica, clay, and mica, inorganic fibrous fillers, e.g., glass fibers, asbestos, quartz wool, carbon fibers, and metal fibers, knitted fabrics made of these fibers, and organic compounds such as aramid fibers, polyester fibers, and various kinds of thermoplastic resins and thermosetting resins, e.g., polyethylene, polypropylene, polyimides, and polybenzimidazole. Further, carbon fibers, metal fibers, graphite powder, metal powders, ZnO powder, or the like may be added in order -to improve the thermal conductivity of the lubricative composition.

The lubricative composition according to this invention is obtained by mixing a monomer or prepolymer for a thermosetting resin with a lubricating oil or a grease in an amount of 10 to 90 wt %, preferably 20 to 50 wt %, based on the amount of the lubricating oil or grease and polymerizing the monomer or prepolymer in the lubricating oil or grease. The lubricative composition thus yielded has almost the same proportion of the resin to the lubricating oil or grease as that before the polymerization, although volatile ingredients have volatilized out and water has been formed during the polymerization.

The lubricative composition according to this invention is produced, for example, by the following method.

First, a monomer or prepolymer for a thermosetting resin is added to a lubricating oil or a grease in the proportion specified above, and the monomer or prepolymer is homogeneously dissolved using, e.g., an ultrasonic dispersing machine. Although the solution thus obtained can be in a completely dissolved clear state or in a slightly turbid state depending on miscibility between the resin and the lubricating oil or grease, the solution in the latter state may be used because the lubricating oil or grease is kept being homogeneously mixed with the resin throughout resin's curing reaction, which will be described below.

In the case where the thermosetting resin is a diailyl phthalate type resin, a hardener is added in an appropriate amount. In the case of a novolak-type phenolic resin, hexamine (hardener) or a resol-type phenolic resin is added in an appropriate amount. Thereafter, the ingredients are homogeneously dissolved using, e.g., an ultrasonic dispersing machine again.

This solution is then poured into an appropriate mold, and the mold containing the solution is maintained at a curing temperature for the resin for about 10 to 60 minutes to thereby obtain a lubricative composition.

In the lubricative composition as the second embodiment of the invention, the silicone oil or silicone grease is homogeneously contained and held in the whole base material comprising a cured silicone rubber because the polymerization reaction of the base silicone for forming a three-dimensionally crosslinked network structure proceeds in such a manner that the silicone oil or silicone grease is included in minute spacings of the network. As a result, the lubricative composition yielded contains the silicone oil or silicone grease in a large amount and the base material is excellent in lubricant-holding ability, so that the silicone oil or silicone grease continues to gradually ooze out over a long time and stable lubricity can be maintained over long.

Since the silicone rubber cured by three-dimensional crosslinking has a heat resistance of 150° C. or higher, it never becomes flowable and unable to retain its shape at high temperatures not below the melting point. Hence, this lubricative composition is usable at higher temperatures than the lubricative compositions employing polyethylene or polypropylene as a base material.

Although the lubricative composition employing polymethylpentene as a base material also has high heat resistance, it has a drawback that the polymer/lubricant mixture should be maintained at a temperature as high as 230 to 260° C. for a certain time period in order to enable the polymer to hold the lubricating oil and this heat treatment may cause deterioration of the lubricating oil, as described hereinabove. In contrast, the silicone rubber serving as a base material in the lubricative composition according to this invention is free from the problem of silicone-oil or silicone-grease deterioration because the polymerization reaction is carried out even at room temperature by adding a hardener to the base silicone and, even when the cure takes much time, the polymerization reaction can be accelerated by maintaining the mixture at a relatively low temperature of about 100° C., and because the cure is not accompanied by heat generation.

The base silicone that can be used in this invention is not particularly limited, and may be an organosiloxane having a terminal functional group, which is a representative silicone. Examples thereof include vinylsiloxane and hydroxysiloxane. A metallosiloxane formed by replacing one of the silicon atoms of any of these siloxanes with other metal, e.g., aluminum or titanium, may by used, by which the heat resistance of the lubricative composition to be yielded can be improved further.

In polymerizing the base silicone, a crosslinking agent and a curing catalyst are added as a hardener. A silane or siloxane having a functional group of 3 or higher can be used as the crosslinking agent, which serves to crosslink molecules of the base silicone to convert the base silicone into a three-dimensionally crosslinked rubbery elastomer. A compound of a metal, e.g., Sn or Pt, can be used as the curing catalyst, which catalyzes the reaction between the base silicone and the crosslinking agent.

These ingredients, i.e., the base silicone and the hardener, may be supplied either as a two-pack type in which the ingredients are separately stored and are mixed just before polymerization or as a one-pack type in which the two ingredients are mixed beforehand and stored in the mixed state at a temperature below the polymerization temperature until it is heat-cured at the time of polymerization. In the case of the two-pack type, it may be any of a combination of a main component consisting of the base silicone and a crosslinking agent with a curing catalyst, a combination of a main component consisting of the base silicone with a hardener consisting of a curing catalyst and a crosslinking agent, and a combination of a main component consisting of the base silicone and a curing catalyst with a crosslinking agent.

On the other hand, the silicone oil that can be used in this invention is not particularly limited as long as it is miscible with the base silicone described above. The lubricating oil miscible with the base silicone is one capable of forming a homogeneous mixture which neither separates into two phases nor yields settlings after being allowed to stand for 24 hours at a temperature of 25° C., by being mixed with the base silicone. Examples thereof include dimethyl silicone oil, silicone oils modified with higher fatty acids, alkylated silicone oils, methylchloro silicone oil, and methylphenyl silicone oil. These silicone oils may contain an oiliness improver.

In place of the silicone oil described above, a grease containing the silicone oil as a base oil can be used in this invention. In this case, polytetrafluoroethylene (PTFE), a metal soap, carbon black, or the like is added as a thickener in an appropriate amount to prepare the grease.

The fillers mentioned hereinabove with regard to the first-embodiment composition may be added for the purpose of enhancing the mechanical strength of the lubricative composition or improving the moldability thereof.

It is also possible to add a silicone powder, e.g., a powder comprising inorganic particles and a silicone oil supported thereon at a high concentration (about 60%), a powder of a highly three-dimensionally crosslinked silicone resin, or an ultrafine powder of a silicone rubber elastomer.

The amount of these additive ingredients to be added is not particularly limited and is suitably selected according to the properties of the lubricative composition to be yielded, the kind of the base silicone, polymerization conditions, etc.

The lubricative composition according to this invention is produced, for example, by the following method.

First, a hardener (crosslinking agent and curing catalyst) is added to a base silicone in an amount necessary for curing, and the ingredients are homogeneously mixed. A silicone oil or a silicone grease is then added to the mixture, and the resulting mixture is stirred with, e.g., a mixer to obtain a homogeneous solution, which is poured into an appropriate mold to thereby obtain a lubricative composition.

The above is a method for two-pack type ingredients. In the case of using one-pack type ingredients, a silicone oil or a silicone grease is added directly to the base silicone/hardener mixture and the resulting mixture is poured into an appropriate mold and then maintained at a temperature not lower than the polymerization temperature, whereby a lubricative composition can be obtained.

The proportion of the base silicone to the silicone oil or silicone grease is preferably such that the amount of the base silicone is from 30 to 90 wt %, especially from 40 to 70 wt %, based on the amount of the silicone oil or silicone grease.

Although the addition of a hardener enables the polymerization reaction of the base silicone to proceed even at a temperature as low as around room temperature to give a rubbery elastomer, the reaction generally takes a long time of several tens of hours before completion. The polymerization time can be reduced by heating the mold containing the reactant solution at an appropriate temperature. This heating need not be conducted at an especially high temperature, and a temperature considerably lower than the deterioration temperature of the silicone oil or silicone grease, e.g., about 100° C., is sufficient. By heating even at such a temperature, the polymerization time can be reduced to about several tens of minutes.

The polymerization of the base silicone proceeds by means of condensation reaction or addition reaction, and either of the reactions may be used in this invention. Although the addition reaction is free from a problem concerning by-products, the condensation reaction yields a by-product such as an alcohol, water, or hydrogen depending on the kind of the base silicone used. However, even when these by-products are included into the base material of the lubricative composition yielded, the properties of the lubricative composition, e.g., lubricity performance, mechanical strength, and retention of shape, are little affected by the by-products. Hence, there is no need of conducting a special treatment for removing these by-products. During the progress of the polymerization, volatile ingredients may be removed by applying a pressure.

The thus-obtained lubricative composition is a rubbery solid which has the shape of the mold cavity and in which the silicone oil or silicone grease is homogeneously held within the base material and part of the oil or grease has oozed out to the surface.

The lubricative composition as the third embodiment of the invention is obtained by crosslinking polynorbornene in the presence of a lubricating oil or grease held in many microvoids of the polynorbornene to thereby unite the crosslinked polynorbornene with the lubricating oil or grease. Therefore, the lubricative composition yielded contains the lubricating oil or grease in a large amount and is also excellent in lubricant-holding ability, so that the lubricating oil or grease continues to gradually ooze out over a long time and stable lubricity can be maintained over long.

Because of the excellent heat resistance of the polynorbornene, the united composition never becomes flowable and unable to retain its shape even when exposed to high temperatures. Moreover, since the crosslinking reaction is completed in a short time, the problem of lubricating-oil or grease deterioration during production can be avoided.

The polynorbornene for use in this invention is a polymer obtained by reacting ethylene with cyclopentadiene by the Diels-Alder reaction to yield norbornene and then subjecting the norbornene to ring-opening polymerization. This polymer is a powdery substance having a highly porous structure. Due to the porosity, polynorbornene can take up a lubricating oil or a grease and hold it in many microvoids thereof in an amount about 2 to 10 times its own weight. From the standpoint of the thermal stability of the crosslinked product which will be described below, it is preferred that the polymer have an ultrahigh molecular weight of about $1 \times 10^6$ to $9 \times 10^6$.

Polynorbornene, which has double bonds in its molecular structure, can be crosslinked, with part of the double bonds being utilized as crosslinking sites, to thereby unite the polymer with a lubricating oil or grease. In addition, since the crosslinking can be carried out with the lubricating oil or grease held in microvoids of the polymer, various shapes can be imparted to the lubricative composition to be obtained.

For crosslinking, a known method may be used, such as a method in which a vulcanizing agent and a vulcanization accelerator are added to the polynorbornene and the resulting mixture is heated, or a method in which a peroxide is used. However, the method using a peroxide is preferred since vulcanization not only necessitates large-scale equipment but also has problems concerning, e.g., the denaturation of the lubricating oil or grease and the control of reaction conditions including vulcanization-time. Usable peroxides include benzoyl peroxide, m-toluoyl peroxide, t-butyl peroxide, t-butyl peroxybenzoate, di-t-butyl peroxyisophthalate, 2,5-dimethyl-2,5-di (benzoylperoxy) hexane, dicumyl peroxide, and the like. These peroxides are added in an amount of about several percents by weight, usually about 1 wt %, based on the amount of the polynorbornene.

On the other hand, the lubricating oil that can be used in this invention is preferable one which is capable of being absorbed by polynorbornene in a large amount, more preferably one which is miscible with polynorbornene. The lubricating oil miscible with polynorbornene is one capable of providing a mixture in which polynorbornene absorbs a lubricating oil so that the mixture weighs two times or more the weight of the polynorbornene, and of which the structure is retained for 24 hours at a temperature of 25° C. Preferred examples of the lubricating oil include ester oils such as diisodecyl adipate, di-2-ethylhexyl sebacate, and tri-2-ethylhexyl trimellitate, alkylnaphthalene oils such as eicosylnaphthalene, alkylphenyl ether oils such as octadecyldiphenyl ether, phenyl ether oils such as tetraphenyl ether, paraffinic mineral oils, and naphthenic mineral oils.

Highly polar oils, e.g., polyglycol oils and polyol ester oils, are undesirable in that since the amounts thereof which can be absorbed by polynorbornene are small, such oils tend to give a crosslinked product which contains and holds the lubricating oil in a small amount and does not sufficiently function as. alubricative composition.

In the present invention, a grease containing the above-described lubricating oil as a base oil can be used in place of the lubricating oil. In this case, a known metal soap, e.g., a lithium soap, a polyurea, bentonite, or the like is added as a thickener to the lubricating oil in an appropriate amount to prepare the grease.

For the purpose of enhancing the mechanical strength of the lubricative composition or improving the moldability thereof, fillers such as the following may be added.

Exemplary fillers that can be added include mineral fillers, e.g., calcium carbonate, talc, silica, clay, and mica, inorganic whisker fillers, e.g., potassium titanate whiskers and aluminum borate whiskers, inorganic fibrous fillers, e.g., glass fibers, asbestos, quartz wool, and metal fibers, knitted fabrics made of these fibers, and organic compounds such as carbon black, graphite powder, carbon fibers, aramid fibers, polyester fibers, and various kinds of thermosetting resins, e.g., polyimides and polybenzimidazole. Further, carbon fibers, metal fibers, graphite powder, metal powders, ZnO powder, or the like may be added in order to improve the thermal conductivity of the lubricative composition.

For the purpose of preventing the thermal deterioration of the polynorbornene, an antioxidant, e.g., N-isopropyl-N'-phenyl-p-phenylenediamine, or other ingredient may be added.

The lubricative composition according to this invention is obtained by mixing polynorbornene with lubricating oil or grease and then crosslinking the polymer with a peroxide. The amount of polynorbornene is from 10 to 50 wt % and the amount of the lubricating oil or grease is from 50 to 90 wt %, based on the total amount of the composition.

The lubricative composition according to this invention is produced, for example, by the following method.

First, polynorbornene and a peroxide are added, along with a filler if necessary, to a lubricating oil or a grease in the proportion specified above, and the ingredients are homogeneously kneaded using a kneader. This mixture is then poured into an appropriate mold, and the mold containing the mixture is maintained at a crosslinking temperature for the polynorbornene for about 10 to 60 minutes to thereby obtain a lubricative composition. By applying a fluorine-compound release agent to the inner wall of the mold before the pouring of the mixture into the mold, mold releasability after crosslinking is improved.

In the lubricative composition as the fourth embodiment of the invention, the lubricating oil or grease is homogeneously contained and held in the whole resin because the three-dimensional crosslinking of either the above-described ultrahigh-molecular polyethylene or a combination of ultrahigh-molecular polyethylene and a diallyl phthalate type monomer proceeds in such a manner that the lubricating oil or grease is included in minute spacings of the network structure formed by the crosslinking. Further, since the ultrahigh-molecular polyethylene itself is a highly oil-absorbing polymer with excellent oil-absorbing performance, the lubricative composition can hold the lubricating oil or grease in a larger amount. Furthermore, since a diallyl phthalate type monomer, which is miscible with various lubricating oils and greases, is used as a base-polymer component, the lubricative composition can be improved in the property of holding a highly polar lubricating oil or grease which has been unable to be held in a large amount in the conventional polyethylene-based lubricative compositions.

Since the lubricative composition is capable of containing a lubricating oil or grease in a large amount and is also excellent in lubricant-holding ability as described above, the lubricating oil or grease continues to gradually ooze out over a long time and stable lubricity can be maintained over long.

In addition, since the ultrahigh-molecular polyethylene comes to have improved heat resistance through crosslinking, it never becomes flowable and unable to retain its shape even when allowed to stand for a long time at a temperature not lower than the melting point of polyethylene (e.g., at 150° C.). Moreover, the use of a diallyl phthalate type monomer, which is a thermosetting resin, as a base polymer component enables further improved heat resistance.

The molecular weight of the ultrahigh-molecular polyethylene is preferably between $1 \times 10^6$ and $6 \times 10^6$. The crosslinking among molecules of the polyethylene is accomplished by the withdrawal of tertiary hydrogen atoms in the polyethylene molecules by a crosslinking agent and the bonding of the resulting tertiary carbon radicals to each other. It is therefore preferred that the ultrahigh-molecular polyethylene be not a linear one but one having a large number of side chains, because such branched polyethylene has more crosslinking sites and more covalent bonds and gives a product with better heat resistance.

Suitable as the crosslinking agent is a peroxide. Usable examples thereof include dicumyl peroxide, 2,5-dimethyl-2,5-di(t-butylperoxy)hexane, 2,5-dimethyl-2,5-di(t-butylperoxy)hexyne-3, $\alpha, \alpha'$-bis(t-butylperoxy)diisopropylbenzene, and t-butyl peroxybenzoate. These crosslinking agents are added in crosslinking usually in an amount of about 2 to 5 wt % based on the amount of the resin.

It is possible to heighten the efficiency of crosslinking by adding, as a crosslinking auxiliary, a monomer having a carbon-carbon double bond (C=C) in the molecular structure (e.g., divinylbenzene). The crosslinking auxiliary may be added in almost the same amount as the crosslinking agent.

On the other hand, the lubricating oil that can be used in this invention is preferably one having low polarity, because low-polarity lubricating oils are advantageous from the standpoints of the amount held by the polymer and the lubricant-holding ability of the polymer. Specifically, preferred examples of the lubricating oil include alkylphenyl ether oils such as octadecyldiphenyl ether, alkylnaphthalene oils such as eicosylnaphthalene, mineral oils, and poly(aolefin) oils.

In place of the above-described lubricating oil, a grease containing the lubricating oil as a base oil can be used. In this case, a known metal soap, e.g., a lithium soap, a urea compound, bentonite, or the like is added as a thickener to the lubricating oil in an appropriate amount to prepare the grease.

In this invention, a diallyl phthalate type monomer may be mixed with the ultrahigh-molecular polyethylene described above. Example of this diallyl phthalate type monomer include diallyl phthalate, diallyl isophthalate, and diallyl terephthalate monomers and mixtures of two or more of these monomers.

The diallyl phthalate type monomer has carbon-carbon double bonds in its structure and, hence, it not only functions as a crosslinking auxiliary but also crosslinks by itself to cure while holding the lubricating oil or grease therein. Since the diallyl phthalate type polymer produced by this crosslinking is a thermosetting resin, it contributes to an improvement in the heat resistance of the lubricative composition. Further, since the diallyl phthalate type monomer is miscible with various lubricating oils, use of the monomer is advantageous when a highly polar lubricating oil is to be held.

The proportion of the ultrahigh-molecular polyethylene to the lubricating oil or grease is preferably such that the amount of the ultrahigh-molecular polyethylene is from 20 to 50 wt % based on the amount of the whole lubricating oil or grease. In the case of mixing a diallyl phthalate type monomer, the amount of diallyl phthalate type monomer is 5 to 100 wt % based on the amount of the ultrahigh-molecular polyethylene.

For the purpose of enhancing the mechanical strength of the lubricative composition or improving the moldability thereof, fillers such as the following may be added.

Exemplary fillers that may be added include calcium carbonate, magnesium carbonate, inorganic whisker fillers, e.g., potassium titanate whiskers and aluminum borate whiskers, inorganic fibrous fillers, e.g., glass fibers, asbestos, and metal fibers, knitted fabrics made of these fibers, and organic compounds such as carbon black, graphite powder, carbon fibers, aramid fibers, polyester fibers, and various kinds of thermosetting resins, e.g., polyimides and polybenzimidazole. Further, carbon fibers, metal fibers, graphite powder,-metal powders, ZnO powder, or the like may be added in order to improve the thermal conductivity of the lubricative composition. In contrast, acidic substances, e.g., clay, silica, and talc, are undesirable in that they induce the ionic decomposition of the peroxide used as a crosslinking agent, resulting in a lowered crosslinking efficiency.

The lubricative composition according to this invention is produced, for example, by the following method.

First, ultrahigh-molecular polyethylene is added to either a lubricating oil or a grease in the proportion specified above along with various additives if necessary, and the ingredients are homogeneously mixed. This mixture is heated to a temperature not lower than the melting temperature of the ultrahigh-molecular polyethylene, e.g., at 160–180° C., to homogeneously dissolve the polyethylene. This solution is then cooled. At the time when the ultrahigh-molecular polyethylene begins to solidify, a crosslinking agent and, if necessary, a crosslinking auxiliary are added, and the ingredients are homogeneously mixed using, e.g., a mixer to give a pasty mixture.

It should be noted that some kinds of lubricating oils or greases may not homogeneously mix with the ultrahigh-molecular polyethylene if the predetermined amount of the ultrahigh-molecular polyethylene is added at a time. In this case, the ultrahigh-molecular polyethylene is mixed in portions with a lubricating oil or grease. For example, use may be made of a method in which about 10–40 wt % of the total polyethylene amount to be used is first mixed with a lubricating oil or grease and dissolved therein by heating and, at the time when the polyethylene begins to solidify by cooling, the remainder is added and mixed along with a crosslinking agent to give a pasty mixture.

In the case of mixing a diallyl phthalate type monomer, it may be added at the first stage to the lubricating oil or grease along with the ultrahigh-molecular polyethylene. Alternatively, a method may be used in which the ultrahigh-molecular polyethylene alone is added first and dissolved by heating and, at the time when the ultrahigh-molecular polyethylene begins to solidify, the monomer is added along with a crosslinking agent. It is also possible to add the monomer in portions, before and after the solidification, as in the method described above.

The pasty mixture is then packed into an appropriate mold, and the mold containing the mixture is maintained at a crosslinking temperature for about 10 to 60 minutes to thereby obtain a lubricative composition. By applying a fluorine-compound release agent to the inner wall of the mold prior to the packing of the pasty mixture into the mold, mold releasability after crosslinking can be improved.

The composition as the fifth embodiment, which comprises the above-described compositions (preferably, those of the first embodiment and the fourth embodiment) and a highly oil-absorbing polymer homogeneously dispersed therein, can have further improved ability to hold the lubricating oil or grease therein due to the highly oil-absorbing polymer.

This composition also has excellent thermal stability because of the use of a thermosetting resin (the first embodiment) and, hence, it never becomes flowable and unable to retain its shape at high temperatures. Further, since the polymerization reaction is completed in a short time, the problem of lubricating-oil or grease deterioration during production can be avoided.

The highly oil-absorbing polymer is a polymer having the property of taking up an oil and holding it among the molecules thereof (adsorption-type oil absorber) or, when in fibrous form, having the property of absorbing an oil by capillarity and holding it among the fibers (storage-type oil absorber). Examples of the material of the polymer include polypropylene, polystyrene, polyethylene, polyurethanes, acrylic resins, e.g., polymethacrylates, and polynorbornene. In the lubricative composition according to this invention, these highly oil-absorbing polymers may be used alone or as a mixture of two or more thereof. In the case of using a mixture, the amount of the lubricating oil or grease that can be held in the lubricative composition can be freely regulated by selecting or changing the combination and proportion of such highly oil-absorbing polymers. For the composition of the fourth embodiment, the highly oil-absorbing polymers other than polyethylene are used.

Of these highly oil-absorbing polymers mentioned above, polypropylene, polystyrene, and polyethylene, which are thermoplastic resins, are preferably ultrahigh-molecular ones having a molecular weight of about $1\times10^6$ to $5\times10^6$, in order that when such a thermoplastic resin is incorporated in a thermosetting resin (the first embodiment) serving as a matrix and a molding is obtained from the mixture, the molding be prevented from thermally softening or becoming flowable upon exposure to a temperature not lower than the melting point of the thermoplastic resin. The highly oil-absorbing polymer consisting of a thermoplastic resin is added preferably in an amount up to 30 wt % based on the amount of the thermosetting resin or the crosslinking resin as a matrix. If the amount thereof is larger than that, the resulting molded product has poor retention of shape because the thermoplastic resin more readily softens or becomes flowable upon exposure to high temperatures.

Although polynorbornene has high oil-absorbing performance and is hence a preferred substance as the highly oil-absorbing polymer for use in the lubricative composition according to this invention, it is subject to autoxidation due to the presence of double bonds in the molecular structure thereof and the oil-absorbing performance is impaired with the progress of the oxidation. It is therefore necessary to crosslink the double bonds with a peroxide. It is advantageous to conduct this crosslinking simultaneously with the reaction of a thermosetting resin, e.g., a diallyl phthalate type resin, which is polymerized and cured with a peroxide. In the case of the fourth-embodiment composition, the crosslinking reaction of the polynorbornene for stabilizing it is performed using a peroxide simultaneously with the crosslinking of the matrix comprising either ultrahigh-molecular polyethylene or a combination of ultrahigh-molecular polyethylene and a diallyl phthalate type monomer.

Preferred as the polystyrene from the standpoint of heat resistance is a crosslinked polystyrene obtained by polymerizing styrene in the presence of divinylbenzene or the like. Since polypropylene undergoes a degradation reaction (splitting of the polymer chain) in the presence of a peroxide, it is necessary to add a crosslinking auxiliary such as diallyl phthalate, triallyl cyanurate, or quinonedioxime in order to inhibit the degradation to permit crosslinking reaction to proceed.

In the case of using polynorbornene as the highly oil-absorbing polymer, an antioxidant, e.g., N-isopropyl-N'-phenyl-p-phenylenediamine, or other ingredient may be added in order to prevent the polynorbornene from undergoing a thermal deterioration.

In the lubricative composition according to this invention, the proportions of the monomer or prepolymer for a thermosetting resin or the crosslinking resin described hereinabove and the highly oil-absorbing resin are as follows.

The amount of the highly oil-absorbing polymer is preferably in an amount of approximately from 5 to 30 wt % based on the amount of the whole lubricating oil or grease. The use of the highly oil-absorbing polymer in such a amount will generally suffice for practical use, although the larger the amount thereof, the more the lubricating oil or grease can be held.

The lubricative composition of the fifth embodiment according to the invention is obtained by mixing a highly oil-absorbing polymer with a monomer or prepolymer for a thermosetting resin in the proportion specified above and polymerizing the thermosetting resin in the lubricating oil or grease, or by mixing a highly oil-absorbing polymer with a crosslinking resin in the proportion specified above and crosslinking the crosslinking resin in the lubricating oil or grease. The lubricative compositions thus yielded each has almost the same proportion of the resin to the lubricating oil or grease as that before the polymerization, although in some of the compositions volatile ingredients have volatilized out and water has been formed during the polymerization.

The lubricative composition according to this invention is produced, for example, by the following method.

First, a monomer or prepolymer for a thermosetting resin is added to a lubricating oil or a grease in the proportion specified above, and the monomer or prepolymer is homogeneously dissolved using, e.g., an ultrasonic dispersing machine. Although the solution thus obtained can be in a completely dissolved clear state or in a slightly turbid state depending on miscibility between the resin and the lubricating oil or grease, the solution in the latter state may be used because the lubricating oil or grease is kept being homogeneously mixed with the resin throughout resin's curing reaction, which will be described below.

In the case where the thermosetting resin is a diallyl phthalate type resin, a hardener is added in an appropriate amount. In the case of a novolak-type phenolic resin, hexamine (hardener) or a resol-type phenolic resin is added in an appropriate amount. Thereafter, the ingredients are homogeneously dissolved using, e.g., an ultrasonic dispersing machine again.

Subsequently, a highly oil-absorbing polymer is added to this solution along with a filler if necessary, and the ingredients are homogeneously mixed using, e.g., a kneader.

This mixture is then poured into an appropriate mold, and the mold containing the mixture is maintained at a curing temperature for the thermosetting resin for about 10 to 60 minutes to thereby obtain a lubricative composition.

The thus-obtained lubricative composition of this invention is a caky solid which has the shape of the mold cavity and in which the lubricating oil or grease is homogeneously held within the lubricative composition and part of the lubricating oil or grease has oozed out to the surface.

Since the lubricative composition according to the present invention is excellent in moldability and retention of shape, it can be used in such a manner that the composition is molded into a shape corresponding to the space of a part which needs lubrication and the molding obtained is fitted as it is into the space. For example, the composition can be used as a lubricating member in place of grease or the like in rolling bearings, e.g., ball bearings and roller bearings, and linear bearings, e.g., linear guides and ball screws, without the necessity of using a sealing member. Furthermore, the composition per se is usable by itself as a slide bearing.

The lubricative composition of the present invention is advantageously used as a lubricant-containing polymer member to be packed into a rolling bearing at the space formed by the outer and inner races and the rolling elements, the rolling bearing being characterized in that the inner circumferential surface of the outer race, the outer circumferential surface of the inner race, and the surfaces of the rolling elements have a coating film of a release agent.

FIG. 1 illustrates a bearing 1 in which, as shown in the figure, the inner circumferential surface of an outer race 2, the outer circumferential surface of an inner race 3, and the surface of a rolling element 4 are covered with a release agent coating film 5, and which contains a lubricant-containing polymer member 6 applied after formation of the coating film 5. The bearing 1 has gaps of a certain size (from 0.1 μm to several tens microns) between the lubricant-containing polymer member 6 and each of the above-mentioned parts which gaps were formed upon the solidification of the lubricant-containing polymer member 6 due to the function of the release agent. Hence, the lubricant-containing polymer member 6 is prevented from directly contacting with each of the outer race 2, inner race 3, and rolling element 4. Further, since the release agent coating film 5 has been formed also at the gaps between the rolling element 4 and each of the outer race 2 and inner race 3, a wear-generated dust of the lubricant-containing polymer member 6 can be prevented from coming into the gaps.

The formation of the release agent coating film 5 in the manner described above enables the bearing 1 to work smoothly with a low torque. In particular, in the case where the release agent used is a fluorine-compound release agent, smoother revolution is attainable.

This bearing can be produced by a simple method. That is, the only procedure which is particularly required is to apply a release agent before a lubricant-containing polymer member is packed into the bearing, the application being accomplished by coating only without the necessity of a special jig. Therefore, a rolling bearing excellent in lubrication can be produced without particularly causing a difficulty in the production process.

A preferred release agent that can be used in the present invention is a fluorine-compound release agent. Examples thereof include a mixture of a phosphoric ester containing a perfluoroalkyl group having 4 to 20 carbon atoms or a salt thereof and a silicone oil (JP-B-53-23270 and JP-B53-23271), a mixture of a phosphoric ester containing a perfluoroalkyl group having 4 to 20 carbon atoms or a salt thereof and a silicone varnish (JP-B-57-48035), a mixture of a polyether compound containing a perfluoroalkyl group and, e.g., a silicone oil (JP-B-59-32513), and a mixture of a urethane compound containing a perfluoroalkyl group and, e.g., a ladder polymer of an organosilsesquioxane (U.S. Pat. No. 5,079,299). Also usable are release agents which are the same as the above-enumerated ones except that they do not contain the silicone compounds. These fluorine-compound release agents may further contain a suitable solvent (e.g., water, isooctane, or HCFC-141b (1,1-dichloro-1-fluoroethane)), with the above-specified compounds as the main components.

Although known release agents. other than fluorine-compound release agents include silicone oils, mineral oils, paraffin waxes, fatty acid derivatives, glycols, talc, mica, etc., these release agents are not very suitable for use because of their insufficient release properties and release lives.

As the lubricant-containing polymer member, use of, e.g., the lubricative composition of the present invention described above is preferred besides the lubricative composition described hereinabove which comprises polyethylene and a grease held therein (JP-B-63-23239).

The process of the present invention for producing the rolling bearing packed with a lubricant-containing polymer member comprises the steps of assembling a bearing by an ordinary method, defatting and cleaning the bearing, subsequently forming a coating film of the release agent, and then packing and solidifying a lubricant-containing polymer member.

For forming the coating film 5 containing a fluorine-compound release agent, use is made, for example, of a method in which the fluorine-compound release agent is applied as it is or after being diluted with a suitable diluent (e.g., water, isooctane, gasoline, or HCFC-141b) to each part of the bearing 1 by spraying or brushing, or a method in which the bearing is dipped into either a solvent containing the release agent or a dispersion of the release agent. Although the coated amount of the release agent is not particularly limited, it is preferred that the release agent be evenly applied so as to result in a film thickness of about 0.1 to 1.0 μm.

After the formation of the coating film 5 containing a fluorine-compound release agent, a lubricant-containing polymer member 6 in a gel or paste state is packed into the bearing 1 at the space formed by the outer race 2, inner race 3, and rolling element 4 and the whole bearing 1 is then heated to solidify the polymer within the space to permit the polymer member 6 to be held in the bearing 1. The temperature, time, and other conditions for this heating vary depending on the kind of the polymer, and are suitably selected.

Thereafter, the bearing 1 is allowed to cool to obtain a rolling bearing packed with a lubricant-containing polymer member.

The lubricative composition of the present invention can be understood more clearly by means of the following examples. However, the invention is not construed as being limited to these examples and may be suitably modified.

EXAMPLE 1

To 7.0 g of di-2-ethylhexyl sebacate was added 3.0 g of diallyl phthalate monomer (DAISO DAP MONOMER, manufactured by DAISO CO., LTD., Japan). The ingredients were homogeneously mixed or dissolved using an ultrasonic dispersing machine. To this mixture was then added 0.03 g of t-butyl peroxybenzoate as a polymerization initiator. The ingredients were mixed or dissolved using the ultrasonic dispersing machine again, thereby giving a mixture A1.

This mixture A1 was then poured into a mold and maintained at 150° C. for 10 minutes to heat-cure the mixture. After cooling, the resulting solid molding was taken out, which was a diallyl phthalate polymer that had cured while homogeneously holding the di-2-ethylhexyl sebacate therein. This molding was a white caky solid having relatively high mechanical strength and such an appearance that the lubricating oil would gradually ooze out to the surface.

Further, the mixture A1 was packed into a 6305 ball bearing (JIS-B-1521) at the spaces between the inner and outer races, i.e., the spaces not occupied by the rolling elements and the ball holders. The mixture applied was cured by the same method. The resulting ball bearing was operated at 150° C. and 3,000 rpm to examine lubricity. As a result, the lubricating member exhibited satisfactory lubricity even after 200 hours.

EXAMPLE 2

To 7.0 g of diisodecyl phthalate was added 3.0 g of a diallyl isophthalate prepolymer (DAISO ISODAP, manufactured by DAISO CO., LTD.). The ingredients were mixed or dissolved in the same manner as in Example 1. Thereto was added 0.03 g of dicumyl peroxide as a polymerization initiator. The ingredients were mixed or dissolved, giving a mixture B1.

The mixture B1 was heat-cured in the same manner as in Example 1. Like the molding obtained in Example 1, the thus-obtained molding was a white caky solid having relatively high mechanical strength and such an appearance that the lubricating oil would gradually ooze out to the surface.

The test with a 6305 ball bearing gave similar results.

EXAMPLE 3

To 7.0 g of octadecyldiphenyl ether was added 3.0 g of diallyl terephthalate monomer (DAISO DAPREN MONOMER, manufactured by DAISO CO., LTD.). The ingredients were mixed or dissolved in the same manner as in Example 1. Thereto was added 0.03 g of t-butyl peroxybenzoate as a polymerization initiator. The ingredients were mixed or dissolved, giving a mixture C1.

The mixture C1 was heat-cured in the same manner as in Example 1. Like the molding obtained in Example 1, the thus-obtained molding was a white caky solid having relatively high mechanical strength and such an appearance that the lubricating oil would gradually ooze out to the surface.

The test with a 6305 ball bearing gave similar results.

EXAMPLE 4

To 7.0 g of di-2-ethylhexyl sebacate was added 3.0 g of a cashew-modified novolak phenol resin (PR-12687, manufactured by Sumitomo Bakelite Co., Ltd., Japan) with which hexamine had been mixed as a hardener in an amount of 10 wt % based on the amount of the original resin and which had been powdered. The ingredients were homogeneously mixed or dissolved using an ultrasonic dispersing machine, giving a mixture D1.

This mixture D1 was then poured into a mold and maintained at 150° C. for 10 minutes to heat-cure the mixture. After cooling, the resulting solid molding was taken out, which was the cashew-modified novolak -phenol resin that had cured while homogeneously holding the di-2-ethylhexyl sebacate therein. This molding was a brown caky solid having relatively high mechanical strength and such an appearance that the lubricating oil would gradually ooze out to the surface.

Further, the mixture D1 was packed into a 6305 ball bearing at the spaces between the inner and outer races, i.e., the spaces not occupied by the rolling elements and the ball holders. The mixture applied was cured by the same method. The resulting ball bearing was operated at 150° C. and 3,000 rpm to examine lubricity. As a result, the lubricating member exhibited satisfactory lubricity even after 200 hours.

EXAMPLE 5

To 7.0 g of tetraphenyl ether was added 3.0 g of a powder of resol-type purely phenolic resin (BELLPEARL S-895, manufactured by Kanebo, Ltd., Japan). The ingredients were homogeneously mixed or dissolved using an ultrasonic dispersing machine, giving a mixture E1.

The mixture E1 was heat-cured in the same manner as in Example 4. Like the molding obtained in Example 4, the thus-obtained molding was a brown caky solid having relatively high mechanical strength and such an appearance that the lubricating oil would gradually ooze out to the surface.

The test with a 6305 ball bearing gave similar results.

EXAMPLE 6

To 7.0 g of tetraphenyl ether were added 1.0 g of an oil-modified novolak phenol resin (PR-13355, manufactured by Sumitomo Bakelite Co., Ltd.) with which hexamine had been mixed as a hardener in an amount of 10 wt % based on the amount of the original resin and which had been powdered and 2.0 g of a powder of resol-type purely phenolic resin (BELLPEARL S-895, manufactured by Kanebo, Ltd.). The ingredients were homogeneously mixed or dissolved using an ultrasonic dispersing machine, giving a mixture F1.

The mixture F1 was heat-cured in the same manner as in Example 4. Like the molding obtained in Example 4, the thus-obtained molding was a brown caky solid having relatively high mechanical strength and such an appearance that the lubricating oil would gradually ooze out to the surface.

The test with a 6305 ball bearing gave similar results.

EXAMPLE 7

To 7.0 g of tetraphenyl ether was added 3.0 g of a polycarbodiimide type resin (Carbodilite 10M-SP, manufactured by NISSHINBO INDUSTRIES, INC., Japan). The ingredients were homogeneously mixed or dissolved using an ultrasonic dispersing machine, giving a mixture G1.

This mixture G1 was then poured into a mold and maintained at 150° C. for 10 minutes to heat-cure the mixture. After cooling, the resulting solid molding was taken out, which was the powdery polycarbodiimide type resin that had cured while homogeneously holding the tetraphenyl ether therein. This molding was a transparent rubbery semisolid having relatively high mechanical strength and such an appearance that the lubricating oil would gradually ooze out to the surface.

Further, the mixture G1 was packed into a 6305 ball bearing at the spaces between the inner and outer races, i.e., the spaces not occupied by the rolling elements and the ball holders. The mixture applied was cured by the same method. The resulting ball bearing was operated at 150° C. and 3,000 rpm to examine lubricity. As a result, the lubricating member exhibited satisfactory lubricity even after 200 hours.

In place of each of the lubricating oils used in Examples 1 to 7 given above, a grease containing the lubricating oil as a base oil was used. As a result, similar lubricative compositions could be obtained.

COMPARATIVE EXAMPLE 1

An unsaturated polyester (ESTER C314PW, manufactured by MITSUI TOATSU CHEMICALS, INC., Japan) was mixed with each of diisodecyl phthalate, diisodecyl adipate, di-2-ethylhexyl sebacate, tri-2-ethylhexyl trimellitate, and tetraphenyl ether using an ultrasonic dispersing machine. As a result, all the mixtures remained turbid, showing that the resin was not miscible with the lubricating oils.

Each of these suspensions was poured into a mold and maintained at 150° C. for 10 minutes. As a result, the mixtures each had separated into the resin and the lubricating oil and the resin only had cured in that state.

COMPARATIVE EXAMPLE 2

A powdery epoxy resin (o-cresol-novolak epoxy manufactured by YUKA SHELL EPOXY KABUSHIKI KAISHA, Japan) was mixed with each of diisodecyl phthalate, diisodecyl adipate, di-2-ethylhexyl sebacate, tri-2-ethylhexyl trimellitate, and tetraphenyl ether using an ultrasonic dispersing machine. As a result, all the mixtures except that containing tetraphenyl ether remained turbid, showing that the resin was not miscible with the other lubricating oils.

The mixture containing tetraphenyl ether was poured into a mold and maintained at 150° C. for 10 minutes. As a result, however, the mixture had separated into the resin and the lubricating oil and the resin only had cured in that state.

As described above, in the lubricative composition of the first embodiment according to the present invention, the lubricating oil or grease is homogeneously contained and held in the whole resin because the three-dimensional crosslinking of the monomer or prepolymer for a thermosetting resin for forming a network structure proceeds in such a manner that the lubricating oil or grease is included in minute spacings of the network. As a result, the lubricative composition yielded contains the lubricating oil or grease in a large amount and is also excellent in lubricant-holding ability, so that the lubricating oil or grease continues to gradually ooze out over a long time and stable lubricity can be maintained over long.

Further, the composition has excellent thermal stability because of the use of a heat-resistant resin. In addition, since the composition is excellent also in moldability and retention of shape, it can be used in such a manner that the composition is molded into a shape corresponding to the space of a part which needs lubrication and the molding obtained is fitted as it is into the space. Therefore, it is usable under a wide range of conditions and applicable to a wide variety of parts.

Moreover, since the polymerization reaction is completed in a short time, the problem of lubricating-oil or grease deterioration during production can be avoided.

EXAMPLE 8

To 5.0 g of a crosslinking agent-containing base silicone (SH9522RTV, manufactured by DOW CORNING TORAY SILICONE CO., LTD., Japan) was added 0.025 g of a curing catalyst (SH9522CAT, manufactured by DOW CORNING TORAY SILICONE CO., LTD.). The ingredients were sufficiently mixed with a spatula. Thereto was then added 4.0 g of dimethyl silicone oil (SH200, manufactured by DOW CORNING TORAY SILICONE CO., LTD.) into which an oiliness improver had been incorporated. The ingredients were transferred to a mixer and mixed therein until they became homogeneous, giving a mixture A2.

This mixture A2 was then poured into a mold and maintained at 100° C. for 1 hour to-heat-cure the mixture. After cooling, the resulting solid molding was taken out, which was a silicone rubber that had cured while homogeneously holding the dimethyl silicone oil therein. This molding was an elastic solid having relatively high mechanical strength and such an appearance that the dimethyl silicone oil would gradually ooze out to the surface.

Further, the mixture A2 was packed into a 6305 ball bearing at the spaces between the inner and outer races, i.e., the spaces not occupied by the rolling elements and the ball holders. The mixture applied was cured by the same method. The resulting ball bearing was operated at 150° C. and 3,000 rpm to examine lubricity. As a result, the lubricating member exhibited satisfactory lubricity even after 200 hours.

EXAMPLE 9

To 5.0 g of a curing catalyst-containing base silicone (SH9556RTV, manufactured by DOW CORNING TORAY SILICONE CO., LTD.) was added 0.5 g of a crosslinking agent (SH9556CAT, manufactured by DOW CORNING TORAY SILICONE CO., LTD.). The ingredients were sufficiently mixed with a spatula. Thereto was then added 4.0 g of a silicone grease (SH44M, manufactured by DOW CORNING TORAY SILICONE CO., LTD.) which contained 10 wt % lithium soap as a thickener. The ingredients were transferred to a mixer and mixed therein until they became homogeneous, giving a mixture B2.

This mixture B2 was then poured into a mold and maintained at 20° C. for 24 hours to cure the mixture. After cooling, the resulting solid molding was taken out, which was a silicone rubber that had cured while homogeneously holding the silicone grease therein. This molding was an elastic solid having relatively high mechanical strength and such an appearance that the silicone grease would gradually ooze out to the surface.

Further, the mixture B2 was packed into a 6305 ball bearing at the spaces between the inner and outer races, i.e., the spaces not occupied by the rolling elements and the ball holders. The mixture applied was cured by the same method. The resulting ball bearing was operated at 150° C. and 3,000 rpm to examine lubricity. As a result, the lubricating member exhibited satisfactory lubricity even after 200 hours.

As described above, in the lubricative composition of the second embodiment according to the invention, the silicone oil or silicone grease is homogeneously contained and held in the whole base material comprising a silicone rubber because the three-dimensional crosslinking of the base silicone for forming a network structure proceeds in such a manner that the silicone oil or silicone grease is included in minute spacings of the network. As a result, the lubricative composition yielded contains the silicone oil or silicone grease in a large amount and the base material is excellent in lubricant-holding ability, so that the silicone oil or silicone grease continues to gradually ooze out over a long time and stable lubricity can be maintained over long.

Further, since the composition is excellent not only in heat resistance and thermal stability but also in moldability and retention of shape, it can be used in such a manner that the composition is molded into a shape corresponding to the space of a part which needs lubrication and the molding obtained is fitted as it is into the space. Therefore, it is usable under a wide range of conditions and applicable to a wide variety of parts.

Moreover, in the case of heating the composition in polymerization, a low temperature and a short time suffice for curing, so that the problem of silicone-oil or silicone-grease deterioration during production can be avoided.

EXAMPLE 10

To 7.5 g of a dialkyldiphenyl ether lubricating oil (MORESCO-HILUBE L-150, manufactured by MATSUMURA OIL RESEARCH COPR., Japan) were added 2.5 g of polynorbornene (NORSOREX, manufactured by NIPPON ZEON CO., LTD., Japan) and 0.1 g of tbutyl peroxybenzoate as a crosslinking agent. The ingredients were kneaded with a kneader for 10 minutes, giving a homogeneous mixture A3.

This mixture A3 was then poured into a mold and maintained at 150° C. for 20 minutes to crosslink the polymer. After cooling, the resulting solid molding was taken out, which was crosslinked polynorbornene that had solidified while homogeneously holding the lubricating oil (dialkyldiphenyl ether lubrication oil) therein. This molding was a brown rubbery solid having relatively high mechanical strength and such an appearance that the lubricating oil would gradually ooze out to the surface.

Into a 6305 ball bearing to which a fluorine-compound release agent (DAIFREE GA-6010, manufactured by DAIKIN INDUSTRIES, LTD., JAPAN) had been applied beforehand by spraying, the mixture A3 was packed at the spaces between the inner and outer races, i.e., the spaces not occupied by the rolling elements and the ball holders. The mixture was then crosslinked by the same method. The resulting ball bearing was operated at 150° C. and 3,000 rpm to examine lubricity. As a result, the lubricating member exhibited satisfactory lubricity even after 200 hours.

EXAMPLE 11

To 8.0 g of a grease (base oil: dialkyldiphenyl ether lubricating oil, thickener: polyurea) (MORESCO-HIGREASE UM-1, manufactured by MATSUMURA OIL RESEARCH COPR.) were added 2.0 g of polynorbornene (NORSOREX, manufactured by NIPPON ZEON CO., LTD.) and 0.1 g of t-butyl peroxybenzoate as a crosslinking agent. The ingredients were kneaded with a kneader for 10 minutes, giving a homogeneous mixture B3.

This mixture B3 was then poured into a mold and maintained at 150° C. for 20 minutes to crosslink the polymer. After cooling, the resulting solid molding was taken out, which was crosslinked polynorbornene that had solidified while homogeneously holding the grease therein. This molding was a brown-white rubbery solid having relatively high mechanical strength and such an appearance that the lubricating oil would gradually ooze out to the surface.

The mixture B3 was subjected to the test with a 6305 ball bearing, giving the same results as in Example 10.

As described above, since the lubricative composition of the third embodiment according to the present invention is a product obtained by crosslinking polynorbornene, which is a highly oil-absorbing polymer, in the presence of a large amount of a lubricating oil or grease held in the polymer, the lubricating oil or grease is homogeneously contained and held in the whole crosslinked polynorbornene. Consequently, the lubricative composition contains the lubricating oil or grease in a large amount and is also excellent in lubricant-holding ability, so that the lubricating oil or grease continues to gradually ooze out over a long time and stable lubricity can be maintained over long.

Further, since the composition is excellent not only in thermal stability but in moldability and retention of shape due to the use of polynorbornene, it can be used in such a manner that the composition is molded into a shape corresponding to the space of a part which needs lubrication and the molding obtained is fitted as it is into the space. Therefore, it is usable under a wide range of conditions and applicable to a wide variety of parts.

Moreover, since the crosslinking reaction is completed in a short time, the problem of lubricating-oil or grease deterioration during production can be avoided.

EXAMPLE 12

To 14.0 g of a dialkyldiphenyl ether lubricating oil (MORESCO-HILUBE LB-100, manufactured by MATSUMURA OIL RESEARCH COPR.) was added 0.6 g of ultrahigh-molecular polyethylene (Hostalen GUR4113, manufactured by HOECHST JAPAN LIMITED). The mixture was heated to 180° C. to homogeneously dissolve the polymer. The solution was allowed to cool, and at the time when the ultrahigh-molecular polyethylene began to solidify, 4.4 g of the same ultrahigh-molecular polyethylene, 0.2 g of t-butyl peroxybenzoate as a crosslinking agent, and 1.0 g of carbon black (ASAHI F-200, manufactured by ASAHI CARBON CO., LTD., Japan) were added. The ingredients were homogeneously mixed with a mixer, giving a pasty mixture A4.

This mixture A4 was then packed into a mold and maintained at 180° C. for 10 minutes to crosslink the polymer. After cooling, the resulting solid molding was taken out, which was ultrahigh-molecular polyethylene that had crosslinked while homogeneously holding the lubricating oil (dialkyldiphenyl ether lubricating oil) therein. This molding was a black solid having relatively high mechanical strength and such an appearance that the lubricating oil would gradually ooze out to the surface.

Into a 6305 ball bearing to which a fluorine-compound release agent (DAIFREE GA-6010, manufactured by DAIKIN INDUSTRIES, LTD.) had been applied beforehand by spraying, the mixture A4 was packed at the spaces between the inner and outer races, i.e., the spaces not occupied by the rolling elements and the ball holders. The mixture was then crosslinked by the same method. The resulting ball bearing was operated at 150° C. and 3,000 rpm to examine lubricity. As a result, the lubricating member exhibited satisfactory lubricity even after 200 hours.

EXAMPLE 13

To 12.0 g of a dialkyldiphenyl ether lubricating oil (MORESCO-HILUBE LB-100, manufactured by MATSUMURA OIL RESEARCH COPR.) was added 0.6 g of ultrahigh-molecular polyethylene (Hostalen GUR4113, manufactured by HOECHST JAPAN LIMITED). The mixture was heated to 180° C. to homogeneously dissolve the polymer. The solution was allowed to cool, and at the time when the ultrahigh-molecular polyethylene began to solidify, 3.4 g of the same ultrahigh-molecular polyethylene, 3.0 g of diallyl isophthalate monomer (DAISO DAP 100 MONOMER, manufactured by DAISO CO., LTD.), 0.2 g of t-butyl peroxybenzoate as a crosslinking agent, and 1.0 g of carbon black (ASAHI F-200, manufactured by ASAHI CARBON CO., LTD.) were added. The ingredients were homogeneously mixed with a mixer, giving a pasty mixture B4.

This mixture B4 was thermally crosslinked in the same manner as in Example 12. Like the molding obtained in Example 12, the thus-obtained molding was a black solid having relatively high mechanical strength and such an appearance that the lubricating oil would gradually ooze out to the surface.

The test with a 6305 ball bearing gave similar results.

EXAMPLE 14

To 15.0 g of a grease (MORESCO-HIGREASE UM-1, manufactured by MATSUMURA OIL RESEARCH COPR.) which contained a dialkyldiphenyl ether lubricating oil as base oil and a urea compound as thickener was added 0.6 g of ultrahigh-molecular polyethylene (Hostalen GUR4113, manufactured by HOECHST JAPAN LIMITED). The mixture was heated to 180° C. to homogeneously dissolve the polymer. The solution was allowed to cool, and at the time when the ultrahigh-molecular polyethylene began to solidify, 4.4 g of the same ultrahigh-molecular polyethylene and 0.2 g of t-butyl peroxybenzoate as a crosslinking agent were added. The ingredients were homogeneously mixed with a mixer, giving a pasty mixture C4.

This mixture C4 was thermally crosslinked in the same manner as in Example 12. Like the molding obtained in Example 12, the thus-obtained molding was a brown-yellow solid having relatively high mechanical strength and such an appearance that the lubricating oil would gradually ooze out to the surface.

The test with a 6305 ball bearing gave similar results.

EXAMPLE 15

To 14.0 g of a dialkyldiphenyl ether lubricating oil (MORESCO-HILUBE LB-100, manufactured by MATSUMURA OIL RESEARCH COPR.) was added 0.6 g of ultrahigh-molecular polyethylene (Hostalen GUR4113, manufactured by HOECHST JAPAN LIMITED). The mixture was heated to 180° C. to homogeneously dissolve the polymer. The solution was allowed to cool, and at the time when the ultrahigh-molecular polyethylene began to solidify, 4.4 g of the same ultrahigh-molecular polyethylene, 0.2 g of t-butyl peroxybenzoate as a crosslinking agent, and 1.0 g of polynorbornene (NORSOREX, manufactured by NIPPON ZEON CO., LTD.) were added. The ingredients were homogeneously mixed with a mixer, giving a pasty mixture D4.

This mixture D4 was thermally crosslinked in the same manner as in Example 12. Like the molding obtained in Example 12, the thus-obtained molding was a white solid having relatively high mechanical strength and such an appearance that the lubricating oil would gradually ooze out to the surface.

The test with a 6305 ball bearing gave similar results.

COMPARATIVE EXAMPLE 3

A pasty mixture E4 was obtained in the same manner as in Example 12 except that t-butyl peroxybenzoate as a crosslinking agent was not added.

This mixture E4 was dissolved and then solidified in the similar manner as in Example 12. Like the molding obtained in Example 12, the thus-obtained molding was a black solid having relatively high mechanical strength and such an appearance that the lubricating oil would gradually ooze out to the surface.

However, the test with a 6305 ball bearing gave unsatisfactory results as follows. Although the lubricative solid remained in position and neither deformed nor became flowable when the bearing was not working, it deformed and became flowable upon initiation of the operation of the bearing and came out from the bearing.

COMPARATIVE EXAMPLE 4

A composition F4 (actual oil content: 31 wt %) was prepared according to the Example 2 given in JP-B-63-21698. The composition was packed into a 6305 ball bearing and tested. As a result, even when the bearing was operated, deformation or fluidization such as that observed in Comparative Example 3 did not occur. However, the rate of oozing of the lubricating oil from the lubricative composition was so high that lubrication became insufficient in several tens of hours.

As described above, in the lubricative composition of the four embodiment according to this invention, the lubricating oil or grease is homogeneously contained and held in the whole resin because the three-dimensional crosslinking of either ultrahigh-molecular polyethylene or a combination of ultrahigh-molecular polyethylene and a diallyl phthalate type monomer proceeds in such a manner that the lubricating oil or grease is included in minute spacings of the network structure formed by the crosslinking. Further, since the ultrahigh-molecular polyethylene itself is a highly oil-absorbing polymer with excellent oil-absorbing performance, the lubricative composition can hold the lubricating oil or grease in a larger amount. Furthermore, due to the use of a diallyl phthalate type monomer as a base-polymer component, which monomer is miscible with various lubricating oils and greases, the lubricative composition can be improved in the property of holding a highly polar lubricating oil or grease which has been unable to be held in a large amount in the conventional polyethylene-based lubricative compositions.

Since the lubricative composition is capable of containing a lubricating oil or grease in a large amount and is also excellent in lubricant-holding ability as described above, the lubricating oil or grease continues to gradually ooze out over a long time and stable lubricity can be maintained over long.

In addition, since the ultrahigh-molecular polyethylene comes to have improved heat resistance through crosslinking, it never becomes flowable and unable to retain its shape even when allowed to stand for a long time at a temperature not lower than the melting point of polyethylene (e.g., at 150° C.). Moreover, the use of a diallyl phthalate type monomer, which is a thermosetting resin, as a base-polymer component enables further improved heat resistance.

EXAMPLE 16

To 7.0 g of a dialkyldiphenyl ether lubricating oil (MORESCO-HILUBE L-150, manufactured-by MAT- SUMURA OIL RESEARCH COPR.) were added 2.0 g of diallyl isophthalate monomer (DAISO DAP 100 MONOMER, manufactured by DAISO CO., LTD.) and 0.1 g of t-butyl peroxybenzoate as a polymerization initiator. The ingredients were homogeneously mixed or dissolved with an ultrasonic dispersing machine. To this mixture were then added 0.5 g of ultrahigh-molecular polyethylene (XM220, manufactured by MITSUI PETROCHEMICAL LTD., Japan) and 0.25 g of an acrylic resin (OLEOSORB PW-190, manufactured by NIPPON SHOKUBAI CO., LTD., Japan) as highly oil-absorbing polymers and 0.25 g of silica (AEROSIL 200, manufactured by NIPPON AEROSIl CO., LTD., Japan) as a filler. The ingredients were mixed with a kneader for 30 minutes, giving a mixture A5.

This mixture A5 was then poured into a mold and maintained at 150° C. for 20 minutes to heat-cure the mixture. After cooling, the resulting solid molding was taken out, which was a diallyl isophthalate polymer that had cured while homogeneously holding the lubricating oil (dialkyldiphenyl ether lubricating oil) therein. This molding was a white caky solid having relatively high mechanical strength and such an appearance that the lubricating oil would gradually ooze out to the surface.

Further, the mixture A5 was packed into a 6305 ball bearing at the spaces between the inner and outer races, i.e., the spaces not occupied by the rolling elements and the ball holders. The mixture applied was cured by the same method. The resulting ball bearing was operated at 150° C. and 3,000 rpm to examine lubricity. As a result, the lubricating member exhibited satisfactory lubricity even after 200 hours.

EXAMPLE 17

To 7.0 g of a dialkyldiphenyl ether lubricating oil (MORESCO-HILUBE L-150, manufactured by MATSUMURA OIL RESEARCH COPR.) were added 2.0 g of diallyl terephthalate monomer (DAISO DAPREN MONOMER, manufactured by DAISO CO., LTD.) and 0.1 g of t-butyl peroxybenzoate as a polymerization initiator. The ingredients were homogeneously mixed or dissolved with an ultrasonic dispersing machine. To this mixture were then added 0.75 g of polynorbornene (NORSOREX, manufactured by NIPPON ZEON CO., LTD.) as a highly oil-absorbing polymer and 0.25 g of potassium titanate whiskers (TISMO-D, manufactured by Otsuka Chemical Co., Ltd., Japan) as a filler. The ingredients were mixed with a kneader for 30 minutes, giving a mixture B5.

This mixture B5 was then poured into a mold and maintained at 150° C. for 20 minutes to heat-cure the mixture and crosslink the polynorbornene simultaneously. After cooling, the resulting solid molding was taken out, which was a diallyl terephthalate polymer that had cured while homogeneously holding the lubricating oil (dialkyldiphenyl ether lubricating oil) therein. This molding was a white caky solid having relatively high mechanical strength and such an appearance that the lubricating oil would gradually ooze out to the surface.

The mixture B5 was subjected to the test with a 6305 ball bearing, giving the same results as in Example 16.

As described above, in the lubricative composition of the fifth embodiment according to the present invention, the lubricating oil or grease is homogeneously contained and held in the whole resin because the three-dimensional crosslinking of the monomer or prepolymer for a thermosetting resin for forming a network structure proceeds in such a manner that the lubricating oil or grease is included in minute spacings of the network. As a result, the lubricative composition yielded contains the lubricating oil or grease in a large amount and is also excellent in lubricant-holding ability, so that the lubricating oil or grease continues to gradually ooze out over a long time and stable lubricity can be maintained over long.

In addition, due to the highly oil-absorbing polymer contained in the structure, the ability to hold the lubricating oil or grease is improved further and a longer lubricity life is attainable.

Further, the composition has excellent thermal stability because of the use of a heat-resistant resin. In addition, since the composition is excellent also in moldability and retention of shape, it can be used in such a manner that the composition is molded into a shape corresponding to the space of a part which needs lubrication and the molding obtained is fitted as it is into the space. Therefore, it is usable under a wide range of conditions and applicable to a wide variety of parts.

Moreover, since the polymerization reaction is completed in a short time, the problem of lubricating-oil or grease deterioration during production can be avoided.

EXAMPLE 18

A 6305 ball bearing was defatted and cleaned, and a fluorine-compound release agent (DAIFREE GA-6010 (air spray), manufactured by DAIKIN INDUSTRIES, LTD.) was then applied thereto by spraying to form a coating film of the release agent. Subsequently, as a material for lubricant-containing polymer member, a mixture obtained by mixing 2.5 g of polynorbornene (NORSOREX, manufactured by NIPPON ZEON CO., LTD.) with 7.5 g of a dialkyldiphenyl ether lubricating oil (MORESCO-HILUBE L-150, manufactured by MATSUMURA OIL RESEARCH COPR.), adding thereto 0.1 g of t-butyl peroxybenzoate as a crosslinking agent, and homogeneously kneading the ingredients was packed into the bearing at the spaces between the inner and outer races, i.e., the spaces not occupied by the rolling elements and the ball holders. This bearing was then transferred to a pressing machine heated at 150° C., where it was kept being pressed for 30 minutes at a pressure of 2 kg/cm$^2$. Thus, the polymer was crosslinked and united with the lubricating oil within the spaces to form a lubricant-containing polymer member.

The thus-obtained 6305 ball bearing packed with the lubricant-containing polymer member worked smoothly with a low torque and showed satisfactory lubrication even after 200-hour operation at 150° C. and 3,000 rpm.

Further, a cylindrical- and a cone-roller bearing each packed with a lubricant-containing polymer member were produced likewise. As a result, satisfactory results were obtained.

Due to the effects of the excellent release agent properties of the fluorine-compound release agent and of the gaps of a certain size which have been formed between the lubricant-containing polymer member and each part of the bearing (i.e., the outer wall of the inner race, the inner wall of the outer race, and the rolling elements), not only the bearing is prevented from being stopped by gripping by the lubricant-containing polymer member, but also the friction generated between the lubricant-containing polymer member and each part of the bearing is only slight. Hence, the increases of torque and bearing temperature are minimized and the bearing can continue to work smoothly with a low torque. In addition to this advantage, stable lubrication is maintained due to the lubricant gradually released from the lubricant-containing polymer member.

The production process is advantageous in that since the only procedure particularly required is to apply a release agent before the packing of a lubricant-containing polymer member without the necessity of a special jig, a rolling bearing excellent in lubrication can be produced without particularly causing a difficulty in the production process.

While the invention has been described in detail and with reference to specific embodiments thereof, it will be apparent to one skilled in the art that various changes and modifications can be made therein without departing from the spirit and scope thereof.

What is claimed is:

1. A rolling bearing filled with a lubricant-containing polymer comprising;
    (i) an outer race and an inner race,
    (ii) rolling elements, and
    (iii) a lubricant-containing polymer filled in the space formed by the outer race, the inner race and the rolling elements,
    wherein a coating film made of a fluorine-compound release agent is formed on the surface of the inner circumference of the outer race, the outer circumference of the inner race, and the surface of the rolling elements, whereby the lubricant-containing polymer is prevented from contacting the surface on which the coating film is formed, and
    the lubricant-containing polymer is made of a lubricative composition selected from the group consisting of:
    (a) a lubricative composition comprising a base material containing a cured silicone rubber and, held in the base material, either a silicone oil or a grease containing the silicone oil as a base oil and is obtained by polymerizing a base silicone for the cured silicone rubber in either the silicone oil or a grease containing the silicone oil as a base oil,
    (b) a lubricative composition comprising polynorbornene and, held therein, either a lubricating oil or a grease containing the lubricating oil as a base oil and is obtained by crosslinking the polynorbomene in the presence of the lubricating oil or grease absorbed therein,
    (c) a lubricative composition comprising ultrahigh-molecular polyethylene and, held therein, either a lubricating oil or a grease containing the lubricating oil as a base oil and is obtained by crosslinking the ultrahigh-molecular polyethylene with either the lubricating oil or a grease containing the lubricating oil as a base oil in the presence of a crosslinking agent, and
    (d) a lubricative composition comprising a matrix comprising ultrahigh-molecular polyethylene and a diallyl phthalate polymer and, held in the matrix, either a lubricating oil or a grease containing the lubricating oil as a base oil and is obtained by crosslinking the ultrahigh-molecular polyethylene and a diallyl phthalate monomer with either the lubricating oil or a grease containing the lubricating oil as a base oil in the presence of a crosslinking agent.

2. A rolling bearing filled with a lubricant-containing polymer comprising:
    (i) an outer race and an inner race,
    (ii) rolling elements, and
    (iii) a lubricant-containing polymer filled in the space formed by the outer race, the inner race and the rolling elements,
    wherein a coating film made of a fluorine-compound release agent is formed on the surface of the inner circumference of the outer race, the outer circumference of the inner race, and the surface of the rolling elements, whereby the lubricant-containing polymer is prevented from contacting the surface on which the coating film is formed, and
    the lubricant-containing polymer is made of a lubricative composition comprising polyethylene and a lubricating oil or a grease containing the lubricating oil as a base oil held therein.

3. The rolling bearing filled with a lubricant-containing polymer of claim 1, wherein the fluorine-compound release agent is selected from the group consisting of:
    a phosphoric ester containing a perfluoroalkyl group having 4 to 20 carbon atoms or a salt thereof, a polyether compound containing a perfluoroalkyl group, a urethane compound containing a perfluoroalkyl group, a mixture of a phosphoric ester containing a perfluoroalkyl group having 4 to 20 carbon atoms or a salt thereof and a silicone oil, a mixture of a phosphoric ester containing a perfluoroalkyl group having 4 to 20 carbon atoms or a salt thereof and a silicone varnish, a mixture of a polyether compound containing a perfluoroalkyl group and a silicone oil, and a mixture of a urethane compound containing a perfluoroalkyl group and a ladder polymer of an organosilsesquioxane.

4. The rolling bearing filled with a lubricant-containing polymer of claim 2, wherein the fluorine-compound release agent is selected from the group consisting of:
    a phosphoric ester containing a perfluoroalkyl group having 4 to 20 carbon atoms or a salt thereof, a polyether compound containing a perfluoroalkyl group, a urethane compound containing a perfluoroalkyl group, a mixture of a phosphoric ester containing a perfluoroalkyl group having 4 to 20 carbon atoms or a salt thereof and a silicone oil, a mixture of a phosphoric ester containing a perfluoroalkyl group having 4 to 20 carbon atoms or a salt thereof and a silicone varnish, a mixture of a polyether compound containing a perfluoroalkyl group and a silicone oil, and a mixture of a urethane compound containing a perfluoroalkyl group and a ladder polymer of an organosilsesquioxane.

5. A process of producing a rolling bearing filled with a lubricant-containing polymer comprising (i) an outer race having an inner circumferential surface and an inner race having an outer circumferential surface, (ii) rolling elements having a surface, and (iii) a lubricant-containing polymer filled in the space formed by the outer race, the inner race and the rolling elements, which comprises:
    assembling a rolling bearing,
    forming a coating film made of a fluorine-compound release agent on the inner circumferential surface of the outer race, the outer circumferential surface of the inner race and the surface of the rolling elements such that the lubricant-containing polymer is prevented from being in contact with the surface on which the coating film is formed, and
    packing and solidifying a lubricant-containing polymer at the space formed by the outer race, the inner race and the rolling elements, wherein the lubricant-containing polymer is made of a lubricative composition selected from the group consisting of:
    (a) a lubricative composition comprising a base material containing a cured silicone rubber and, held in the base material, either a silicone oil or a grease containing the silicone oil as a base oil and is obtained by polymerizing a base silicone for the cured silicone rubber in either the silicone oil or a grease containing the silicone oil as a base oil, (b) a lubricative composition comprising polynorbomene and, held therein, either a lubricating oil or a grease containing the lubricating oil as a base oil and is obtained by crosslinking the polynorbomene in the presence of the lubricating oil or grease absorbed therein, (c) a lubricative composition comprising ultrahigh-molecular polyethylene and, held therein, either a lubricating oil or a grease containing the lubricating oil as a base oil and is obtained by crosslinking the ultrahigh-molecular polyethylene with either the lubricating oil or a grease containing the lubricating oil as a base oil in the presence of a crosslinking agent, (d) a lubricative composition comprising a matrix comprising ultrahigh-molecular polyethylene and a diallyl phthalate polymer and, held in the matrix, either a lubricating oil or a grease containing the lubricating oil as a base oil and is obtained by crosslinking the ultrahigh-molecular polyethylene and a diallyl phthalate monomer with either the lubricating oil or a grease containing the lubricating oil as a base oil in the presence of a crosslinking agent, and (e) a lubricative composition comprising polyethylene and a lubricating oil or a grease containing the lubricating oil as a base oil held therein.

6. The process of claim 5, wherein the fluorine-compound release agent is selected from the group consisting of a phosphoric ester containing a perfluoroalkyl group having 4 to 20 carbon atoms or a salt thereof, a polyether compound containing a perfluoroalkyl group, a urethane compound containing a perfluoroalkyl group, a mixture of a phosphoric ester containing a perfluoroalkyl group having 4 to 20 carbon atoms or a salt thereof and a silicone oil, a mixture of a phosphoric ester containing a perfluoroalkyl group having 4 to 20 carbon atoms or a salt thereof and a silicone varnish, a mixture of a polyether compound containing a perfluoroalkyl group and a silicone oil, and a mixture of a urethane compound containing a perfluoroalkyl group and a ladder polymer of an organosilsesquioxane.

7. A rolling bearing filled with a lubricant-containing polymer comprising:

(A) an outer race and an inner race, (B) rolling elements, and (C) a lubricant-containing polymer filled in the space formed by the outer race, the inner race and the rolling elements, wherein a coating film made of a fluorine-compound release agent is formed on the surface of the inner circumference of the outer race, the outer circumference of the inner race, and the surface of the rolling elements, whereby the lubricant-containing polymer is prevented from contacting the surface on which the coating film is formed, and the lubricant-containing polymer is made of a lubricative composition comprising a thermosetting resin selected from the group consisting of diallyl phthalate resin, phenolic resin and polycarbodiimide resin and, held therein, either a lubricating oil or a grease containing the lubricating oil as a base oil and is obtained by polymerizing a monomer or prepolymer for the thermosetting resin or by crosslinking a crosslinking resin in either a lubricating oil miscible with the thermosetting resin or a grease containing the lubricating oil as a base oil.

8. A process of producing a rolling bearing filled with a lubricant-containing polymer comprising (i) an outer race having an inner circumferential surface and an inner race having an outer circumferential surface, (ii) rolling elements having a surface, and (iii) a lubricant-containing polymer filled in the space formed by the outer race, the inner race and the rolling elements, which comprises:

assembling a rolling bearing, forming a coating film made of a fluoriine-compound release agent on the inner circumferential surface of the outer race, the outer circumferential surface of the inner race and the surface of the rolling elements such that the lubricant-containing polymer is prevented from being in contact with the surface on which the coating film is formed, and packing and solidifying a lubricant-containing polymer at the space formed by the outer race, the inner race and the rolling elements, wherein the lubricant-containing polymer is made of a lubricative composition comprising a thermosetting resin selected from the group consisting of diallyl phthalate resin, phenolic resin and polycarbodiimide resin and, held therein, either a lubricating oil or a grease containing the lubricating oil as a base oil and is obtained by polymerizing a monomer or prepolymer for the thermosetting resin or by crosslinking a crosslinking resin in either a lubricating oil miscible with the thermosetting resin or a grease containing the lubricating oil as a base oil.

* * * * *